United States Patent
Costigan et al.

(10) Patent No.: US 9,298,912 B2
(45) Date of Patent: Mar. 29, 2016

(54) SYSTEM AND METHOD FOR DISTINGUISHING HUMAN SWIPE INPUT SEQUENCE BEHAVIOR AND USING A CONFIDENCE VALUE ON A SCORE TO DETECT FRAUDSTERS

(71) Applicant: Behaviometrics AB, Lulea (SE)

(72) Inventors: Neil Costigan, Lulea (SE); Ingo Deutschmann, Merseburg (DE); Tony Libell, Lulea (SE); Johan Lindholm, Boden (SE); Peder Nordström, Lulea (SE)

(73) Assignee: Behaviometrics AB, Lulea (SE)

( * ) Notice: Subject to any disclaimer, the term of this patent is extended or adjusted under 35 U.S.C. 154(b) by 223 days.

(21) Appl. No.: 13/866,183

(22) Filed: Apr. 19, 2013

(65) Prior Publication Data

US 2013/0283378 A1  Oct. 24, 2013

Related U.S. Application Data

(60) Provisional application No. 61/637,559, filed on Apr. 24, 2012.

(51) Int. Cl.

| | |
|---|---|
| *G06F 21/00* | (2013.01) |
| *G06F 21/55* | (2013.01) |
| *G06N 5/02* | (2006.01) |
| *G06F 21/31* | (2013.01) |
| *G06K 9/00* | (2006.01) |
| *G06K 9/62* | (2006.01) |

(52) U.S. Cl.
CPC .............. *G06F 21/55* (2013.01); *G06F 21/316* (2013.01); *G06K 9/00355* (2013.01); *G06K 9/6296* (2013.01); *G06N 5/02* (2013.01); *G06F 2221/2133* (2013.01)

(58) Field of Classification Search
CPC .............. G06K 9/6267; G06K 9/6296; G06K 9/00355; G06F 21/55; G06F 21/316; G06F 2221/2133; G06N 5/02
USPC .............................. 726/5–7, 28, 30; 713/186; 382/119–123; 706/46
See application file for complete search history.

(56) References Cited

U.S. PATENT DOCUMENTS

| | | | | |
|---|---|---|---|---|
| 2004/0187037 A1* | 9/2004 | Checco | .......................... | 713/202 |
| 2005/0238207 A1* | 10/2005 | Tavares | .......................... | 382/115 |

* cited by examiner

*Primary Examiner* — Eleni Shiferaw
*Assistant Examiner* — Alexander Lapian
(74) *Attorney, Agent, or Firm* — Michael J. Feigin, Esq.; Feigin & Fridman

(57) ABSTRACT

Recording, analyzing and categorizing of user interface input via touchpad, touch screens or any device that can synthesize gestures from touch and pressure into input events. Such as, but not limited to, smart phones, touch pads and tablets. Humans may generate the input. The analysis of data may include statistical profiling of individual users as well as groups of users, the profiles can be stored in, but not limited to data containers such as files, secure storage, smart cards, databases, off device, in the cloud etc. A profile may be built from user/users behavior categorized into quantified types of behavior and/or gestures. The profile might be stored anonymized. The analysis may take place in real time or as post processing. Profiles can be compared against each other by all the types of quantified behaviors or by a select few.

3 Claims, 6 Drawing Sheets

Example System describing Behavior Sorting

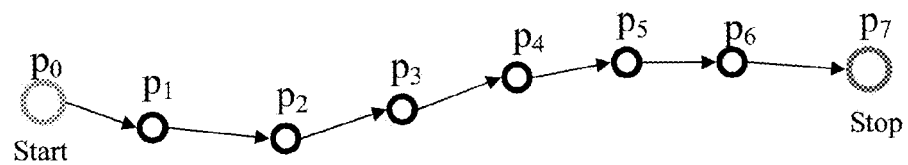
Figure 1 - Collection of input points (measuring points)
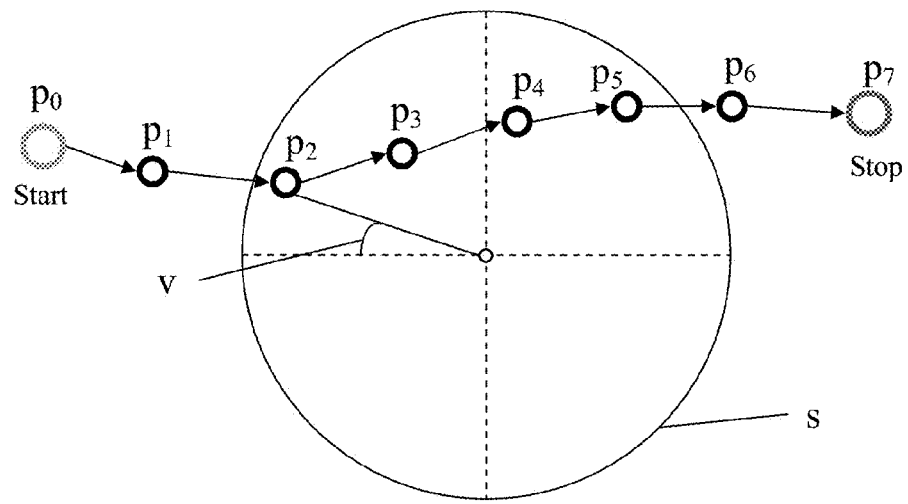
Figure 2 - Single measuring point

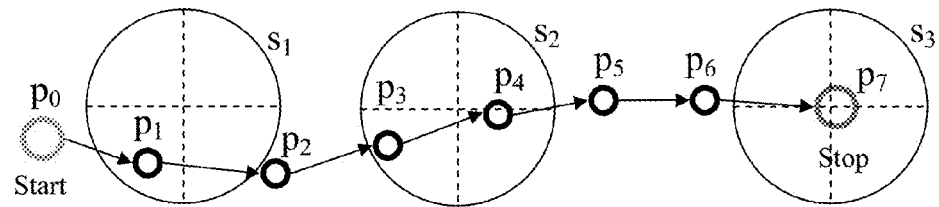
Figure 3 - Multiple measuring points
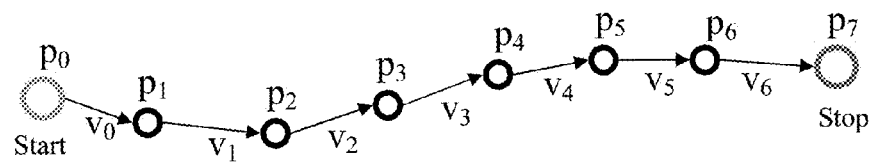
Figure 4 - Acceleration
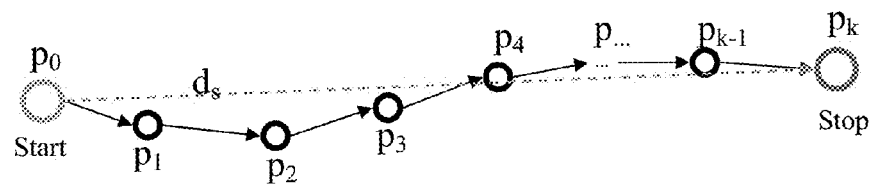
Figure 5 - Quotient

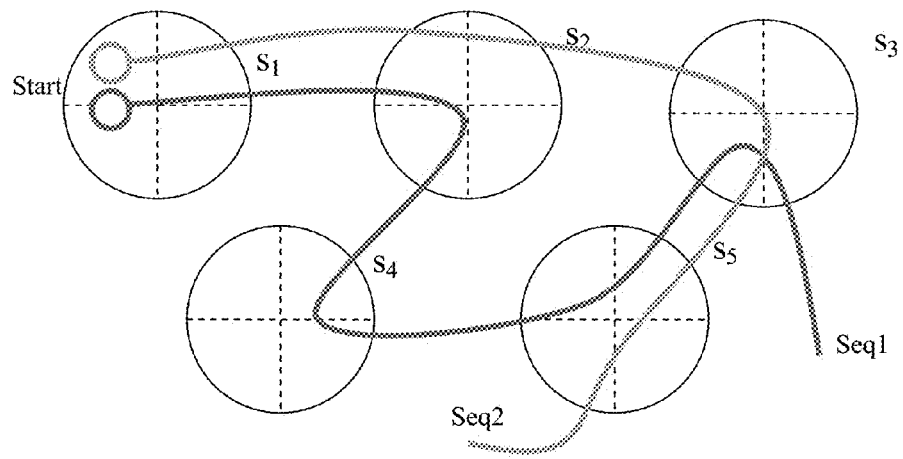
Figure 6 - Sequence
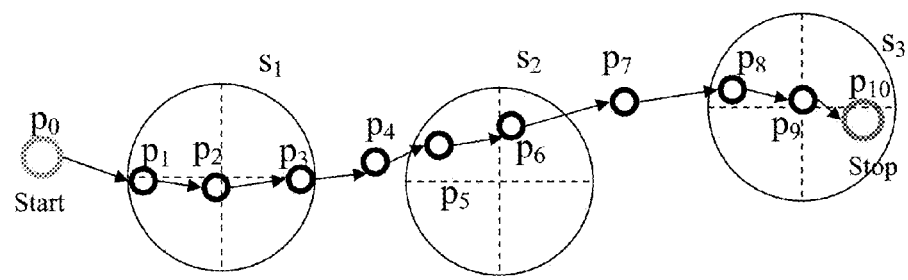
Figure 7 - Flight
Figure 8 - Dominant side

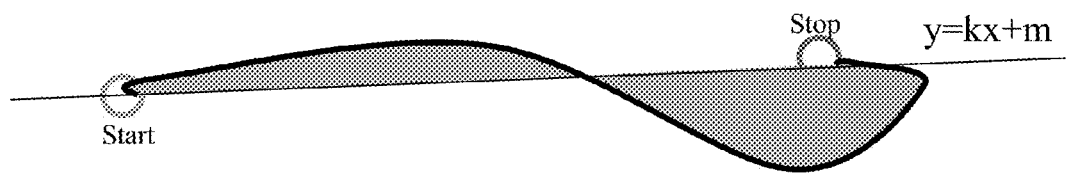
Figure 9 - Area

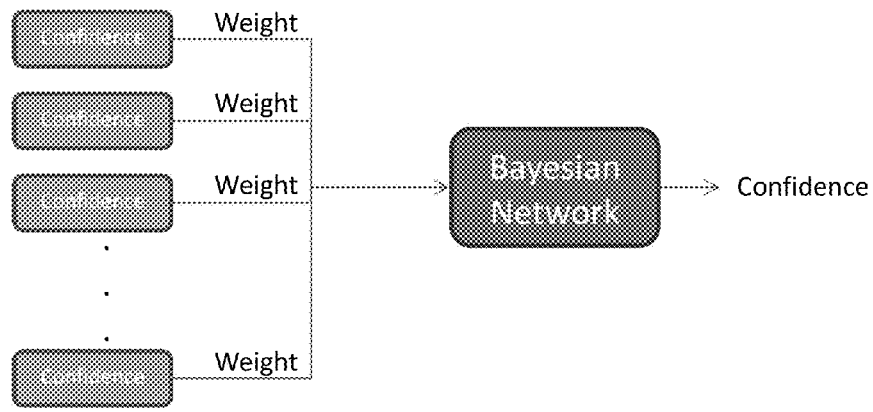
Figure 10 Example of joining confidence score with Bayesian Network
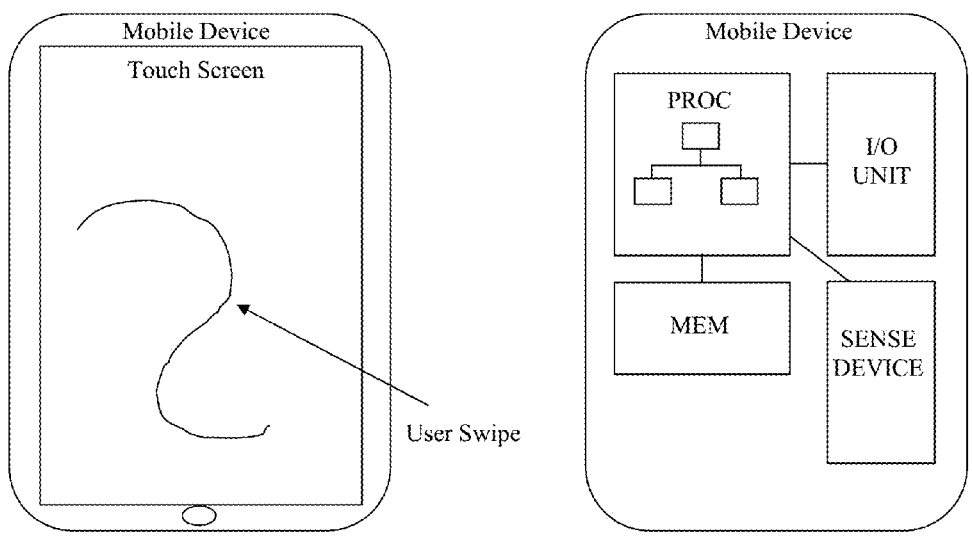
FIG. 11 Example System with Sensory Device on which Process Operates
FIG. 12 Example System with Sensory Device on which Process Operates

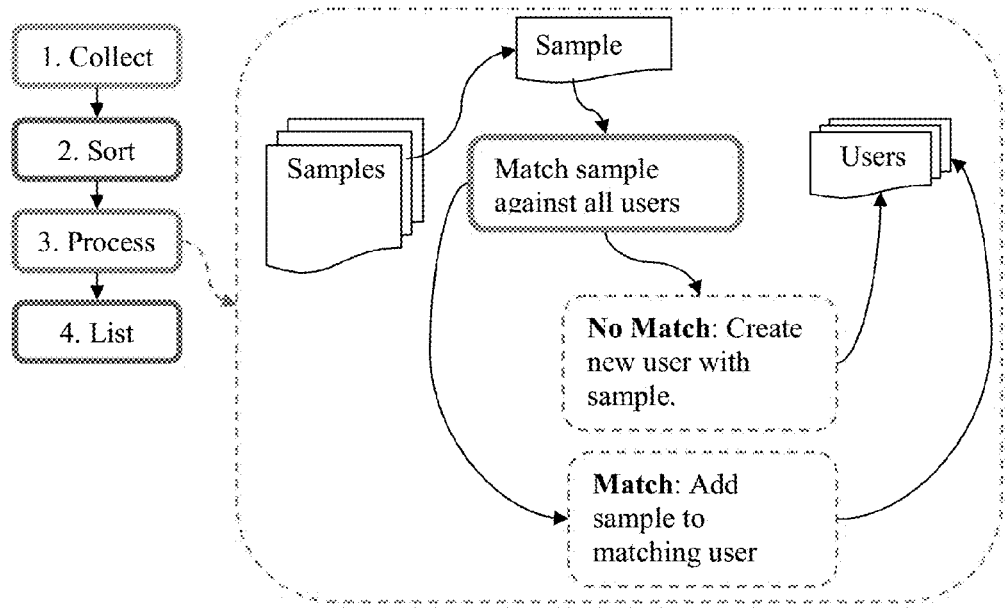
Fig 13 Example System describing Behavior Sorting
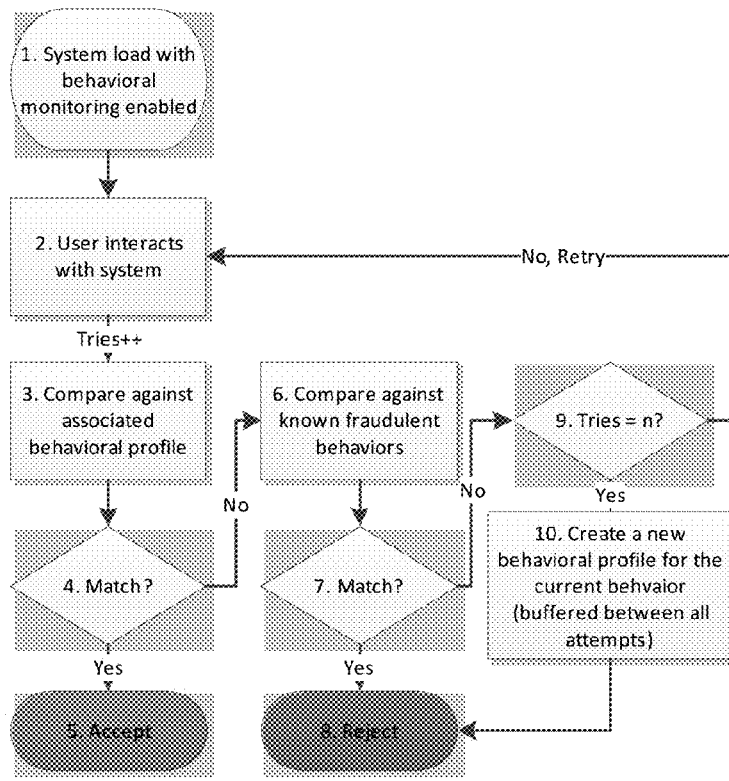
FIG 14 Fraudster identification and, using behavioral biometric algorithms that gather, filter, ana-

SYSTEM AND METHOD FOR DISTINGUISHING HUMAN SWIPE INPUT SEQUENCE BEHAVIOR AND USING A CONFIDENCE VALUE ON A SCORE TO DETECT FRAUDSTERS

FIELD OF THE DISCLOSED TECHNOLOGY

The present invention describes a method and system that uses behavioral biometric algorithms that gather, filter, analyze and distinguish human swipe input sequence behavior from other human behavior and or machine behavior. Furthermore, the principles of the present invention may generate a confidence value on a score, i.e. how sure the system is in its classification (the likelihood that it is or is not a classification error). This is done, but not limited to, by checking the quality of a sample and the quality of a profile to which the sample is compared. Furthermore, the present invention is showing a possibility to detect fraudsters automatically without manual interaction of supervisors.

BACKGROUND OF THE DISCLOSED TECHNOLOGY

Computing devices, such as mobile handsets, are traditionally designed to deliver performance on restricted hardware. Since there is no 'built-in security' commonly found on purpose built computers with increased mobility (e.g., smart phones), information stored in the computing devices is much more likely to end up in the wrong hands. Adding smart card readers or expecting users to carry One-Time-Password tokens (OTPs) to use with the computing devices is not realistic. Out-of-band solutions such as SMS or other communications protocols are cumbersome and not user friendly for widespread use. People pick weak passwords that are easy to remember or just easy to type on a handset and voice biometric solutions are expensive and disrupt the user experience. Multilayered security can be achieved by combining three pillars: (i) something you have (e.g., the phone as a token), (ii) something you know (e.g., your PIN), and (iii) something you are (e.g., your physical or behavioral metrics).

SUMMARY OF THE DISCLOSED TECHNOLOGY

The principles of the present invention provide for recording, analyzing, and categorizing user interface input via touchpad, touch screens or any electronic device that can receive and sense or synthesize gestures from human touch and pressure into input events, giving a confidence value on the score and detecting fraudsters without manual interaction of a supervisor. Such electronic devices may include, but are not limited to, smart phones, touch pads and tablets.

BRIEF DESCRIPTION OF THE DRAWINGS

The accompanying drawings, which are incorporated into and constitute a part of the specification, illustrate one or more example embodiments of the invention and, together with the detailed description serve to explain their principles and implementations.

In:

FIG. 1 is shown a collection of input points,

FIG. 2 is shown a single measuring point with a collision detection circle and input points, FIG. 3 are shown multiple measuring points with collision detection circles and input points, FIG. 4 is shown the acceleration of multiple points, FIG. 5 is shown the quotient of two points or shapes, FIG. 6 are shown two sequences with multiple shapes, FIG. 7 is shown the flight behavior with multiple input points and three shapes, FIG. 8 is shown the dominant side on the lower side of two points, FIG. 9 is shown the area between two points of a sequence, FIG. 10 is shown an Example of joining confidence score with a Bayesian network, FIG. 11 is shown an example system with a sensory device on which a process for verifying a user or detecting fraudsters, FIG. 12 is shown an example system with a sensory device on which a process for verifying a user or detecting fraudsters, FIG. 13 is shown an example system describing behavior sorting, FIG. 14 is shown a Flowchart describing Fraudster Identification.

DETAILED DESCRIPTION OF EMBODIMENTS OF THE DISCLOSED TECHNOLOGY

Input from a touch, mouse, or other gesture sensory interface may be gathered in a raw format to be processed to determine different behavioral traits. The raw format may include points in space, such as a plane, with the highest resolution available for a particular system. Each point has one or more coordinate values (e.g., Cartesian coordinates), timing and any other information the system may provide, such as, but not limited to, pressure. Multiple points or a set of points are called an input sequence. An input sequence can be processed to different behaviors (sequence behavior), which might include the total aggregated distance, time or pressure, acceleration, angle and others. If an input sequence is touching or crossing shapes, which are visible on the touch screen it is called a shape input sequence (see FIGS. 2, 3, 4).

FIG. 1 shows an example collection of input points (input sequence) where each point has information of the touch or event, such as Cartesian coordinates (x, y), time (t) and pressure (pr). Additionally, a floating touch input, where the finger of the user is not leaving the touch screen could be used similar, to record the input points, and use the touch as an additional behavior. It should be understood that a wide variety of input devices that respond to touch and/or motion may be utilized in accordance with the principles of the present invention.

The raw input may be filtered by either excluding points, taking the average over two or more points to create new points, or performing another filtering technique. To eliminate errors, filtering may be applied to specific data of some points. To anonymize users, filters may also be applied to specific data of some points, or some points maybe omitted.

Two or more points may be used to generate and/or calculate behaviors, such as, but not limited to, the velocity between the points.

Geometric figures, points, lines, and polygons may be implemented as collision detection to be used to create additional behaviors. These figures, points, lines and polygons may also be movable to create additional behaviors.

FIG. 2 shows an example where the point p2 is inside a collision detection circle. The center of the circle s and the point p2 may be used to calculate a behavior angle v.

Two or more collision detection shapes may be used to generate and/or calculate behaviors such as, but not limited to, the velocity between the collision detection shapes. It should be understood that a geometric or non-geometric shape other than a circle may be utilized.

FIG. 3 displays how 3 circles s1, s2, s3 may be used for behavior analysis. s1 receives p1 properties while s2 receives the properties from both p3 and p4. If several points are inside a geometric shape, one of them or all of them may be used by taking the average of the points, for example. Any behavior applicable to raw points may also be applicable do a series of geometric shapes.

Examples of Quantified Tests/Behaviors

Every test/behavior may be calculated from any point or shape in a series of touch points or shapes to any other point or shape.

Angle Behavior

The angle value may be calculated from any point or shape in a series of touch points to any other point or shape. It could be, but not limited to, the first point inside a geometric shape, such as P2 in FIG. 2, or the last point inside a geometric shape, such as p5 in FIG. 2. These two examples would be the entering and exiting points to calculate the entering and exiting angle.

Velocity Behavior

Velocity v is the change in position respect to time. Velocity can be calculated by dividing the distance d between two points or shapes by the time:

$$d = \sqrt{(p_{x1} - p_{x0})^2 + (p_{y1} - p_{y0})^2}$$
$$v = \frac{d}{(t_1 - t_0)}$$

The distance and time may be aggregated for several points before the velocity is calculated to give an average velocity. The velocity may be divided into its components according to the coordinate system in use. For example, in the Cartesian coordinate system, the velocity of the x and y component would be.

$$d_x = p_{x1} - p_{x0}$$
$$v_x = \frac{d}{(t_1 - t_0)}$$
$$d_y = p_{y1} - p_{y0}$$
$$v_y = \frac{d}{(t_1 - t_0)}$$

Acceleration Behavior

FIG. 4 shows a series of touch points with velocity vectors shown between successive touch points. Acceleration is the rate of change of velocity of the touch input. The acceleration can be calculated by dividing the change in velocity between two points and the time ($t=t_2-t_0$).

$$a = \frac{(v_1 - v_0)}{(t_2 - t_0)}$$

Quotient Behavior $$d_s = \sqrt{(p_{xk} - p_{x0})^2 + (p_{yk} - p_{y0})^2}$$
$$d_a = \sum_{n=0}^{k-1} \sqrt{(p_{x(n+1)} - p_{xn})^2 + (p_{y(n+1)} - p_{yn})^2}$$
$$q = \frac{d_a}{d_s}$$

FIG. 5 shows a series of touch points that may be used to determine quotient behavior. The quotient behavior is the quotient q between the shortest distance ds and the aggregated distance da of two points or shapes.

Sequence Behavior

FIG. 6 shows a pair of touch input curves or sequences that are used to determine sequence behavior. The sequence behavior is the total aggregated distance, time or pressure for a touch input. A shape input sequence is the total aggregated distance, time or pressure for a touch input, that moves over two or more collision detection shapes (see FIGS. 1, 2, 3). The behavior is distinguished by which shapes are touched and is also directional, i.e. the s1 to s2 sequence is not the same as s2 to s1. Continuing with examples FIG. 6: Seq1 is the distance/time/pressure sequence when a touch input moves over the shapes s1→s2→s4→s5→s3, while seq2 is the sequence when the input moves over s1→s2→s3→s5. The total time, distance or pressure defines the sequence behavior. It is not limited to total time, distance or pressure, it could also be the mean or median etc.

A start sequence is beginning at the first touch until reaching the first shape. The end sequence is from leaving the last shape to the end of the touch.

Shapes

The shapes might resemble an empty PINPAD or, might be denoted by numbers or letters, so the user is able to remember also complex sequences.

Flight Behavior

FIG. 7 shows a series of touch points that may be created by a user interfacing with a touch pad or other sensory device to define a flight. Flight is a categorizing behavior that uses two or more shapes to categorize any other basic behavior, like pressure or velocity.

It categorizes behavior by how the input sequence enters and exits shapes. For example, the average velocity between the entering and exiting points of two shapes is shown in Table 1

TABLE 1

| Shape 1 | Shape 2 | Velocity |
|---------|---------|----------|
| Enter   | Enter   | $v_0$    |
| Enter   | Exit    | $v_1$    |
| Exit    | Enter   | $v_2$    |
| Exit    | Exit    | $v_3$    |

TABLE 2

| Shape 1 | Shape 2 | Shape 3 | Time  |
|---------|---------|---------|-------|
| Enter   | Enter   | Enter   | $t_0$ |
| Enter   | Exit    | Enter   | $t_1$ |
| Exit    | Enter   | Exit    | $t_2$ |
| Exit    | Exit    | Exit    | $t_3$ |
| ...     | ...     | ...     | ...   |

As shown in FIG. 7, p1, p5, and p8 are entering points while p3, p6 and p10 are exiting points. The behavior between points p1 and p5 would be the enter/enter behavior for the shapes s1 and s2. While the behavior between the points p3 and p8 would be the exit/enter behavior for shapes s1 and s3. The behavior between the point's p1, p5 and p10 would denote an enter/enter/exit categorization. The behavior categories for the sample FIG. 7 are shown in Table 2. The flight behavior could be, but not limited to, the average pressure, velocity, time or distance between the shapes in the sequence.

Dominant Side Behavior

FIG. 8 shows a touch sequence to illustrate a dominant side. The dominant side behavior checks weather the touch sequence is on one or the others side of the shortest distance between two shapes or points. As shown, the dominant side is to the lower side of the shortest distance between the two points.

Area Behavior

FIG. 9 is an illustration showing a touch sequence that includes two regions that define a certain area. The area behavior is the total area between the actual touch sequence and the shortest distance between two shapes or points. It is described by the enclosing curve. The area might be calculated using an integral over the enclosing curve.

Curve Fitting Behavior

Fit a Bezier curve to the actual input sequence and use the Bezier constants as behavior.

Height/Heat Map Behavior

Add a two-dimensional integer array or map using defined dimensions.

The size of the integer array can respond to the resolution of the touch screen or might be adjusted by a factor to make different resolutions comparable.

Each time a measuring point is activated the hit count for that particular point is increased. An algorithm for image recognition can be used to compare the maps. The heat map might also be split into sections, by putting a grid over the area.

Time/Local Time

The local time of the user can be recorded. An algorithm for calculating the probability of the sleeping time can be used as understood in the art. Example System Description User Separation FIG. 13

In the biometric system, such as a behavioral system, template data may be collected and stored for use in verifying a user accessing a system, by comparing a current behavioral data sample against a previously recorded template. As described below, where behavioral data has been collected, but not yet associated with a particular user, the principles of the present invention may be used to identify and distinguish individual users. As input/behavioral data, the above described processing and other behavior input processing might be used.

A sample system can be constructed the following way:

1. The System collects/acquires behavioral data from at users.

2. The System may classify each collected/acquired behavioral sample by some quantifiable characteristic of the given sample, for example, but not limited to, key press/key flight time. When using a mouse or touchscreen, it is possible to use additionally: angle, acceleration, velocity, quotient, flight, dominant side, area, curve fitting, heat map and distance and then sorts the data.

2.1. The system may also do a rough sort, using clustering algorithms, on the characteristics of the biometric samples, for example, but not limited to, key press/key flight time. When using a mouse or touchscreen, it is possible to use additionally: angle, acceleration, velocity, quotient, flight, dominant side, area, curve fitting, heat map and distance.

2.2. The system may also check if the characteristics of the biometric sample are the same as a previously collected biometric sample. As natural persons are not capable to reproduce their input, a replay attack generated by a computer system might be detected. To detect more sophisticated replay attacks, the input might be checked against former inputs using probability distribution functions like the Gauss distribution, as a previously collected biometric sample might be "noised" by a potential attacker. Other distribution functions might be as well used. If a replay attack is discovered, a flag is added to the biometric sample, and a signal is raised.

3. The system may take a sorted container L with n samples and traverse it. Each sample may be processed by a set of neural networks and/or statistical engines. The sample may be fed into the neural networks and/or statistical engines, and the system may choose the neural network and/or statistical engine that is the best match. If all networks and/or statistical engines are tested and no match has been found, a new neural network and/or statistical engine may be created based from that sample by training the new neural network/statistical engine with the sample. The new neural network and/or statistical engine may be added to the set of neural networks/statistical engines.

4. Each biometric sample may thereby be associated with a neural network and/or statistical engine, such that each is representing a user.

Calculating the Confidence

Factors that could influence the quality of the biometric sample can be, but are not limited to, the size of biometric sample, type of data of the sample (which might be gestures, keystrokes or other mentioned behavioral traits) and the number of tests that can be applied to the biometric sample.

Quality of the Reference Sample/Profile

Factors that may influence the quality of the biometric reference sample/profile can be, but are not limited to, the number of biometric samples the reference profile is built on (training level), the size of the samples that the reference profile was built on, what kind of samples the reference profile was built on and how consistent the biometric data are from which the reference profile learned. People change their behavior over time, mainly when they start to use new mobile devices. After some time they get used to their devices and learn to use them differently. So their behavior is changing over time. Some people change their behavior faster than others. That's why it is important to check, how consistent the behavior of the user is. This can be achieved by comparing former behaviors to recent ones.

Quality of the Sample

Factors that could influence the quality of the sample can be, but are not limited to, the size of biometric sample, type of data and the number of tests that can be applied to the biometric sample.

Comparing the Sample with Profiles of Other Users

By testing the current sample against one or more profiles from other users, it is possible to get an indication about the probability of a classification error. This might be done by taking the correct profile of the user and then randomly select X other users. If any of those profiles score higher than the correct profile it could indicate a classification error. Another possibility is to do a search against the entire profile database. The correct user should be in the top 10 percent. If not, it could be that there is a classification error, or it is not the right user or a fraudster. This may be used as input to the confidence level.

Analyzing the Tests which could be Done on the Sample

Not all store behavioral profiles are covering all possible behavior a user might be able to do. That's why by comparing the acquired sample to the stored profile, only a partial match can be reached. By analyzing the information which tests against the profile could be done on the sample, the confidence can be calculated better.

Calculating the Confidence

The confidence can be calculated, but is not limited to, using either dynamic, static or a combination of the biometric sample and the reference profile(s). One way is to use empirical findings or a static list of confidence values can be calculated. Another way is calculating the confidence on an individual basis, by comparing the biometric sample to, but not limited to reference profile(s)/samples(s) to determine the relative confidence. A combination of both calculations can be used to get higher accuracy.

Joining the Results Together

Joining together several confidence levels can be done by weighting them on importance and reliability. Joining them together can be done with regular statistical methods and may include, but is not limited to min, max, average, median, performing calculations in the distribution and Bayesian networks. This can be done like shown on FIG. 10 using a weighted Bayesian network.

Detecting Fraudsters FIG 14

The system that the user is accessing starts to monitor the behavior (1). The behaviors, which can be collected, might include: keyboard interactions, mouse interactions, web form filling, touch, gesture and pressure interactions, or even eye tracing. While the user is interacting with the system, the system may buffer the behavior (2). When the user is done with the interaction (for example submitting a form), the system compares the behavior and rate it against the behavioral profile that is associated with the assumed user (3). The user is accepted (5) if there is a match (4) between the current behavior and the stored profile. If there is no match, it is assumed, that the user is a fraudster. The behavior may then be checked against known fraudsters (6). If there is a match against a profile in the fraudulent user database, then the user is rejected (8). If there is no match against the fraudulent user database, the user may then be asked to re-authenticate with his or her behavior, as long as the number of retries is less than n (9). If the user has failed multiple times in a row and is not known as a fraudster, it could mean that it is a new fraudster trying to interact with the system. The system may create a new profile (10), based the input data stored in the behavioral buffer, and store the new profile in the known fraudster database. A user might be also included into the known fraudster database, if a transaction of the user has been identified as fraudulent previously. The user can then finally be rejected (8).

In step 6 may be included a check, if the behavioral input is a replay attack, by checking against previous behaviors. If an identical behavior is found, it is certainly a replay attack. But even if it is differing from a former recorded behavior, by applying a Gaussian or another distribution function, it might be a computer generated replay attack, and the user the may be asked to re-authenticate with his or her behavior, as long as the number of retries is less than n (9). The user will be flagged as potential machine generated input.

FIG. 11 is an illustration of an illustrative mobile device with a touch screen device enabling a user to swipe, creating an input sequence. FIG. 12 is a block diagram of the mobile device of FIG. 11 showing internal electronic components, including a processing unit, memory, input/output unit, and sense device (e.g., touch screen). The memory unit shown includes software that may be executed by the processing unit to distinguish swipe input sequence behavior as described here. The processing unit, in response to a user performing a swipe, may execute the software to perform calculations, as previously described, to determine whether the user is the user to which the mobile device belongs. In one embodiment, the memory may store behavioral data that is associated with one or more swipes that the user has previously made during a registration process of the mobile device or during previous use of the mobile device. In another embodiment the calculations might happen in a distributed environment, so that the profiles are stored on a central computer system and the analysis of the behavior is executed on a central server. It should be understood that the drawings of the mobile device are illustrative and that additional and/or different components may be utilized in supporting and performing the processes described herein.

The previous description is of a preferred embodiment for implementing the invention, and the scope of the invention should not necessarily be limited by this description. The scope of the present invention is instead defined by the following claims.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

What is claimed is:

1. A method for calculating confidence in classification of user behavior, the method comprising:

generating a behavioral profile for an authorized user based on at least one data sample obtained from said authorized user;

following generation of said behavioral profile, obtaining a behavioral data sample from a user;

comparing said behavioral data sample to said behavioral profile for said authorized user;

based on said comparing, classifying said behavioral data sample as belonging to said authorized user or as belonging to another user; and following said classifying, conducting an analysis of the confidence of said classifying based on comparing said behavioral data sample with profiles of other users and on at least two of the following: quality features of a previously generated profile, quality features of said behavioral data sample, and tests which are performed on said behavioral data sample, wherein a. said analysis based on said quality features of a previously generated profile including analysis of at least three of the following:
 i. a number of said at least one data samples used to generate said behavioral profile,
 ii. a size of said at least one data samples used to generate said behavioral profile
 iii. a type of said at least one data samples used to generate said behavioral profile, and
 iv. consistency of the at least one data samples used to generate said behavioral profile b. said analysis based on said quality features of said behavioral data sample including analysis of at least two of the following:
 i. a length of said behavioral data sample,
 ii. a size of said behavioral data sample,
 iii. a type of said behavioral data sample, and
 iv. anonymized data to calculate the confidence, c. said analysis based on said tests which are performed on said behavioral data sample including analysis of at least two of the following:
 i. a number of said tests that are performed,
 ii. a weighting of said tests that are performed, iii. a quality of said tests that are performed,
iv. a confidence of said tests that are performed, and
v. a type of said tests that are performed,
d. said comparing said behavioral data sample with profiles of other users including at least two of the following:
  i. comparing said behavioral data sample with profiles of other users,
  ii. comparing a confidence of said behavioral data sample in regard to said behavioral profile of said authorized user with the confidence of said behavioral data sample in regard to profiles of other users, and
  iii. comparing the score of said behavioral data sample in regard to said behavioral profile of said authorized user with the score of said behavioral data sample in regard to said profiles of other users; and
comparing said behavioral data sample against previously approved behaviors using a Gaussian or other distribution function; and
rejecting said user or asking said user to re-authenticate if said comparison results in the confidence of a fraud being greater than the confidence of the behavioral data sample belonging to said authorized user.

2. A method according to claim 1, further comprising rejecting said user if said analysis results in the confidence of a fraud being greater than the confidence of the behavioral data sample belonging to said authorized user.

3. A method according to claim 1, further comprising identifying and signaling generated replay attacks by comparing said behavioral data sample with previously approved behaviors.

\* \* \* \* \*